United States Patent
Katukam et al.

(10) Patent No.: US 12,107,855 B2
(45) Date of Patent: Oct. 1, 2024

(54) METHODS AND SYSTEMS FOR NETWORK SECURITY

(71) Applicant: Nile Global, Inc., San Jose, CA (US)

(72) Inventors: Suresh Katukam, Milpitas, CA (US); Promode Nedungadi, San Jose, CA (US); Avinash Kumar, San Ramon, CA (US); Avoy Nanda, Dublin, CA (US)

(73) Assignee: Nile Global, Inc., San Jose, CA (US)

( * ) Notice: Subject to any disclaimer, the term of this patent is extended or adjusted under 35 U.S.C. 154(b) by 281 days.

(21) Appl. No.: 17/697,843

(22) Filed: Mar. 17, 2022

(65) Prior Publication Data
US 2023/0300130 A1    Sep. 21, 2023

(51) Int. Cl.
*H04L 9/40* (2022.01)
*H04L 61/103* (2022.01)
*H04L 61/5014* (2022.01)

(52) U.S. Cl.
CPC ........ H04L 63/0876 (2013.01); H04L 61/103 (2013.01); H04L 61/5014 (2022.05); H04L 63/166 (2013.01); H04L 63/20 (2013.01)

(58) Field of Classification Search
CPC ...... G06F 21/54; G06F 21/554; G06F 21/566; G06F 21/577; G06F 21/64; H04L 63/0876; H04L 61/103; H04L 61/5014; H04L 63/166; H04L 63/20
See application file for complete search history.

(56) References Cited

U.S. PATENT DOCUMENTS

| | | | |
|---|---|---|---|
| 9,043,884 B2 * | 5/2015 | Behringer | H04L 63/0823 726/5 |
| 10,374,872 B2 | 8/2019 | Ratkovic et al. | |
| 2006/0193300 A1 * | 8/2006 | Rawat | H04W 12/126 370/338 |
| 2016/0134642 A1 * | 5/2016 | Hamid | H04L 63/045 713/160 |
| 2018/0013798 A1 * | 1/2018 | Pallas | H04L 12/4641 |
| 2018/0260807 A1 | 9/2018 | Yang et al. | |
| 2018/0316673 A1 * | 11/2018 | Shah | H04W 12/06 |
| 2021/0184390 A1 | 6/2021 | Mutnuru et al. | |
| 2021/0367839 A1 * | 11/2021 | Vanderveen | H04L 41/0894 |

FOREIGN PATENT DOCUMENTS

| | | | | |
|---|---|---|---|---|
| CN | 113507709 A | * | 10/2021 | |
| WO | WO-2011051028 A1 | * | 5/2011 | ........... H04L 63/168 |

OTHER PUBLICATIONS

Author Unknown, LAN/MAN Standards Committee, "IEEE Standard for Local and Metropolitan Area Networks—Port-Based Network Access Control", IEEE Std 802.1X-2020. Published Feb. 28, 2020.*

Lear al at., "Manufacturer Usage Description Specification", Internet Engineering Task Force (IETF) Request for Comments: 8520, Published Mar. 2019.*

* cited by examiner

*Primary Examiner* — Carl G Colin
*Assistant Examiner* — Habibullah

(74) *Attorney, Agent, or Firm* — LOZA & LOZA, LLP

(57) ABSTRACT

Embodiments of a device and method are disclosed. In an embodiment, a method for network security involves determining whether a device connected to a network port of a switch of a network is a native device or a non-native device for the network and in response to determining whether the device is the native device or the non-native device for the network, performing native device authentication or non-native device authentication.

15 Claims, 9 Drawing Sheets

METHODS AND SYSTEMS FOR NETWORK SECURITY

BACKGROUND

Growing adoption of networks, such as, enterprise campus networks allows enterprises to increase network coverage and functionality. For example, due to the dynamic nature of the business and campuses, switches, gateways, access points (APs), and/or client devices, such as, laptops, printers, servers, security cameras, and/or other connected Internet of things (IoT) devices are typically interconnected in a network. However, security measures between devices can be complicated and challenging because different genres of devices (e.g., native and non-native devices) that can be present in a network. Therefore, there is a need for network security technology that can work with different genres of network devices and safeguard the security of a network.

SUMMARY

Embodiments of a device and method are disclosed. In an embodiment, a method for network security involves determining whether a device connected to a network port of a switch of a network is a native device or a non-native device for the network and in response to determining whether the device is the native device or the non-native device for the network, performing native device authentication or non-native device authentication. Other embodiments are also described.

In an embodiment, determining whether the device is the native device or the non-native device for the network includes determining whether the device is the native device or the non-native device for the network based on Link Layer Discovery Protocol (LLDP) information related to the device.

In an embodiment, determining whether the device is the native device or the non-native device for the network includes determining whether the device is the native device or the non-native device for the network based on Dynamic Host Configuration Protocol (DHCP) information related to the device.

In an embodiment, the method further includes prior to native device authentication or non-native device authentication is completed, limiting data traffic through the network port of the switch from the device.

In an embodiment, the method further includes before native device authentication or non-native device authentication is completed, only allowing a message containing Link Layer Discovery Protocol (LLDP), Dynamic Host Configuration Protocol (DHCP), or Address Resolution Protocol (ARP) information, a Transport Layer Security (TLS) message within one hop, and an IEEE 802.1X port-based Network Access Control (PNAC) message from the device through the network port of the switch.

In an embodiment, the method further includes before native device authentication or non-native device authentication is completed, directing data traffic from the device to a default page.

In an embodiment, in response to determining whether the device is the native device or the non-native device for the network, performing native device authentication or non-native device authentication includes performing native device authentication when the device is determined as the native device and performing non-native device authentication when the device is determined as the non-native device.

In an embodiment, performing native device authentication when the device is determined as the native device includes exchanging security certificates between the switch and the device.

In an embodiment, the method further includes allowing the device to access a plurality of network resources in the network when native device authentication is successfully performed.

In an embodiment, performing non-native device authentication when the device is determined as the non-native device comprises exchanging port-based Network Access Control (PNAC) messages between the switch and the device.

In an embodiment, the method further includes allowing the device to access only a subset of network resources in the network when non-native device authentication is successfully performed.

In an embodiment, the switch includes an access switch (AS) of the network or a distribution switch (DS) of the network.

In an embodiment, the AS is connected to at least one distribution switch (DS) of the network.

In an embodiment, the device includes a wireless access point (AP).

In an embodiment, a method for network security involves at a switch of a network, determining whether a device connected to a network port of the switch is a native device or a non-native device for the network and in response to determining whether the device is the native device or the non-native device for the network, performing native device authentication or non-native device authentication using the switch.

In an embodiment, determining whether the device is the native device or the non-native device for the network using the switch includes determining whether the device is the native device or the non-native device for the network based on LLDP information or DHCP information related to the device that is received at the switch.

In an embodiment, the method further includes prior to native device authentication or non-native device authentication is completed, directing data traffic from the device to a default page.

In an embodiment, in response to determining whether the device is the native device or the non-native device for the network, performing native device authentication or non-native device authentication using the switch includes performing native device authentication using the switch when the device is determined as the native device and performing non-native device authentication using the switch when the device is determined as the non-native device.

In an embodiment, performing native device authentication when the device is determined as the native device using the switch includes exchanging security certificates between the switch and the device, and wherein performing non-native device authentication when the device is determined as the non-native device using the switch comprises exchanging port-based Network Access Control (PNAC) messages between the switch and the device.

In an embodiment, a method for network security involves at an access switch (AS) of a network, determining whether a device connected to a network port of the AS is a native device or a non-native device for the network based on Link Layer Discovery Protocol (LLDP) information or Dynamic Host Configuration Protocol (DHCP) information related to the device, where the AS is connected to at least one distribution switch (DS) of the network, and in response to determining whether the device is the native device or the non-native device for the network, performing native device authentication by exchanging security certificates between the AS and the device or non-native device authentication by exchanging port-based Network Access Control (PNAC) messages between the AS and the device.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
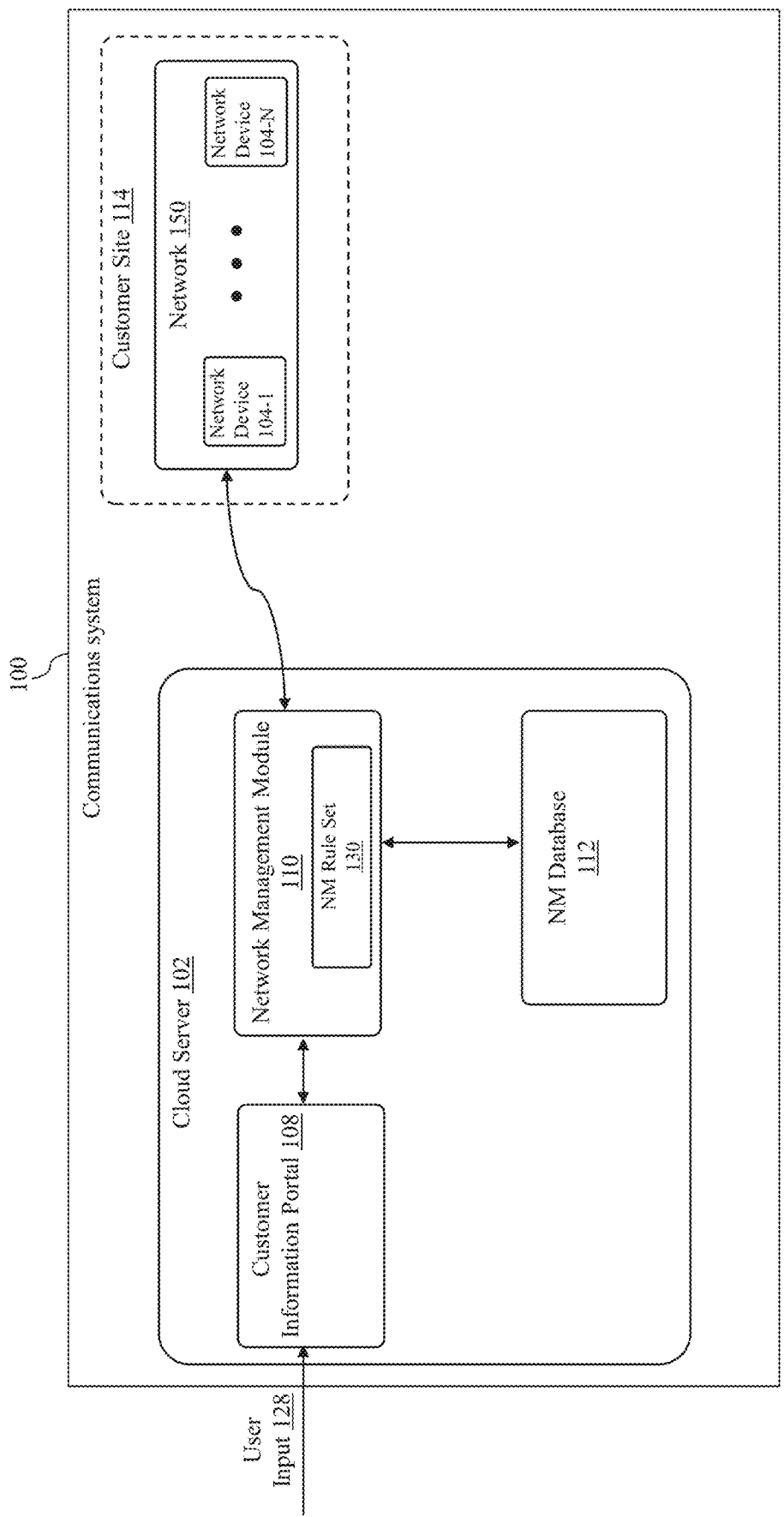
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102 and at least one deployed network 150 within a customer site 114. The cloud server and/or the deployed network may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one deployed network, and/or more than one customer site. In another example, although the cloud server and the deployed network are shown in FIG. 1 as being connected in certain topology, the network topology of the communications system 100 is not limited to the topology shown in FIG. 1.

The cloud server 102 can be used to provide at least one service to a customer site (e.g., to the deployed network 150 located at the customer site 114). The cloud server may be configured to facilitate or perform a network management service (e.g., a security service, such as, an authentication service) to network devices (e.g., the deployed network 150) at the customer site. Because the cloud server can facilitate or perform a network management service or operation for network devices at the customer site, network management efficiency can be improved. In addition, because the cloud server can facilitate or perform a network management service or operation for network devices at the customer site, a user or customer of the customer site can be notified of a device and/or network outage. Consequently, device and/or network outage time can be reduced. In some embodiments, the cloud server is configured to generate a user interface to obtain input information, for example, a floor plan of a customer site. In some embodiments, the user interface includes a graphical user interface. The cloud server may be implemented in hardware (e.g., circuits), software, firmware, or a combination thereof. In some embodiments, the cloud server is hosted or executed in a public cloud computing environment such as Amazon Web Services (AWS), and/or a private cloud computing environment such as an enterprise cloud server. In some embodiments, the cloud server is implemented on a server grade hardware platform, such as an x86 architecture platform. For example, the hardware platform of the cloud server may include conventional components of a computing device, such as one or more processors (e.g., central processing units (CPUs)), system memory, a network interface, storage system, and other Input/Output (I/O) devices such as, for example, a mouse and a keyboard (not shown). In some embodiments, the processor is configured to execute instructions, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations, and other data.

In the embodiment depicted in FIG. 1, the cloud server 102 includes a network management module (NMM) 110, a customer information portal 108 connected to the NMM 110, and a network management (NM) database 112 configured to store NM data. The NMM, the customer information portal, and/or the NM database may be implemented in hardware (e.g., circuits), software, firmware, or a combination thereof. Although the illustrated cloud server is shown with certain components and described with certain functionality herein, other embodiments of the cloud server may include fewer or more components to implement the same, less, or more functionality. For example, in some embodiments, the cloud server includes more than one NMM, more than one customer information portal, and/or more than one NM database. In another example, although the NMM, the customer information portal, and the NM database are shown in FIG. 1 as being connected in a certain topology, the network topology of the cloud server is not limited to the topology shown in FIG. 1. In addition, although the customer information portal 108 is shown in FIG. 1 as being a component of the cloud server 102, in other embodiments, the customer information portal may be implemented outside of the cloud server. In some embodiments, the NMM 110 is configured to facilitate or perform a network management (NM) service (e.g., a security service, such as, an authentication service) to network devices (e.g., the deployed network 150) at the customer site 114, for example, using an NM rule set 130. The NM rule set 130 may include one or more NM rules (e.g., security rules, such as, authentication rules) for network devices at the customer site 114, for example, for performing an NM service (e.g., a security service, such as, an authentication service) to network devices at the customer site 114. In some embodiments, the NMM 110 is configured to generate and/or transmit at least one alert (e.g., a device outage alert, a network throughput alert, and/or a network security alert) regarding a network deployed and/or to be deployed at the customer site or a network operator site, for example, to an administrator or a user or customer (e.g., a layperson such as a worker on-site or an end-user such as an employee) at the customer site 114. In some embodiments, the NM database 112 is configured to store NM data (e.g., security data) for a network deployed and/or to be deployed at the customer site (e.g., a list of network devices deployed or to be deployed at the customer site). In some embodiments, the NM database 112 is configured to store the at least one NM alert. Because the NMM can facilitate or perform a security service (e.g., an authentication service) for network devices at the customer site, security operation efficiency can be improved. In addition, because the NMM can facilitate or perform a network security service or operation for network devices at the customer site, an administrator or a customer can be notified of device and/or network conditions or outages. Consequently, device and/or network outage, low performance time, or a security breach period can be shortened. The customer information portal 108 is configured to receive user input 128. In some embodiments, the customer information portal is configured to include or generate a user interface that allows a customer to input information related to the customer site 114 (e.g., the floor plan of the customer site 114) and/or information associated with an NM service for the customer site 114, such as one or more specific requirements or restrictions.

In the communications system 100 depicted in FIG. 1, the customer site 114 may include one or more buildings, and each building may include one or more floors. Network devices that can be deployed at the customer site may include any type of suitable network devices. For example, network devices may be designated to be deployed to a specific building, a specific floor within a building, and/or a specific location on a floor of a building. A network device that can be deployed at the customer site may be fully or partially implemented as an Integrated Circuit (IC) device. In the embodiment depicted in FIG. 1, the network 150 includes one or more network devices 104-1, . . . , 104-N, where N is a positive integer. In some embodiments, at least one of the network devices 104-1, . . . , 104-N is a wired and/or wireless communications device that includes at least one processor (e.g., a microcontroller, a digital signal processor (DSP), and/or a CPU), at least one wired or wireless communications transceiver implemented in one or more logical circuits and/or one or more analog circuits, at least one wired or wireless communications interface and that supports at least one wired or wireless communications protocol, and/or at least one antenna. For example, at least one of the network devices 104-1, . . . , 104-N is compatible with Institute of Electrical and Electronics Engineers (IEEE) 802.3 protocol and/or one or more wireless local area network (WLAN) communications protocols, such as IEEE 802.11 protocol, and/or a short-range communications protocol, such as Bluetooth™. In some embodiments, at least one of the one or more network devices 104-1, . . . , 104-N is a wired communications device that is compatible with at least one wired local area network (LAN) communications protocol, such as a wired router (e.g., an Ethernet router), a wired switch, a wired hub, or a wired bridge device (e.g., an Ethernet bridge). In some embodiments, at least one of the network devices 104-1, . . . , 104-N is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, the network 150 includes at least one distribution switch (DS) or distribution layer switch that functions as a bridge between a core layer switch and an access layer switch, at least one head end (HE) or gateway, at least one access switch (AS) that can directly interact with a lower-level device (e.g., a wireless AP), at least one wireless AP, and/or at least one wireless sensor that wirelessly connects to a wireless AP. In some embodiments, at least one of the network devices 104-1, . . . , 104-N is a wireless station (STA) that wirelessly connects to a wireless AP. For example, at least one of the network devices 104-1, . . . , 104-N may be a laptop, a desktop personal computer (PC), a mobile phone, or other wireless device that supports at least one WLAN communications protocol (e.g., an IEEE 802.11 protocol)).

Figure 2:
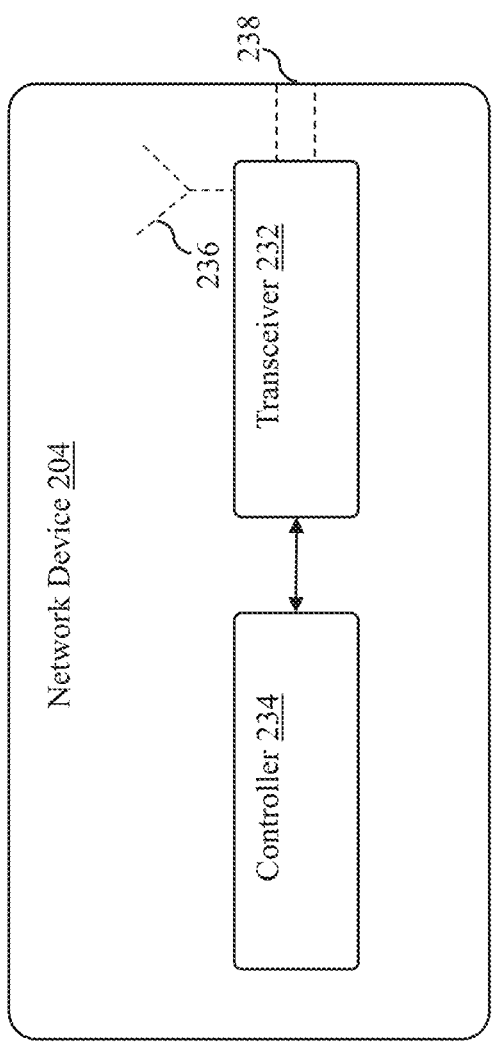
FIG. 2 depicts an embodiment of a network device of the communications system depicted in FIG. 1.

FIG. 2 depicts an embodiment of a network device 204 of the communications system 100 depicted in FIG. 1. The network device 204 may be an embodiment of a network device 104-1, . . . , or 104-N that is included in the deployed network 150 in FIG. 1. However, network devices that can be included in the deployed network 150 depicted in FIG. 1 are not limited to the embodiment depicted in FIG. 2. The network device 204 may be any suitable type of network device. For example, the network device 204 may be a distribution switch (DS), a gateway or headend (HE), an access switch (AS), a wireless access point (AP), a sensor, a laptop, a desktop personal computer (PC), or a mobile phone. In the embodiment depicted in FIG. 2, the network device 204 includes at least one wireless and/or wired transceiver 232, at least one optional antenna 236 operably connected to the transceiver 232, at least one optional network port 238 operably connected to the transceiver 232, and a controller 234 operably connected to the transceiver 232. In some embodiments, the transceiver 232 includes a physical layer (PHY) device. The transceiver 232 may be any suitable type of transceiver. For example, the transceiver 232 may be an LAN transceiver (e.g., an Ethernet transceiver), a short-range communications transceiver (e.g., a Bluetooth™ or Bluetooth™ Low Energy (BLE) transceiver) or a WLAN transceiver (e.g., a transceiver compatible with an IEEE 802.11 protocol). In some embodiments, the network device 204 includes multiple transceivers, for example, an LAN transceiver (e.g., an Ethernet transceiver), a short-range communications transceiver (e.g., a Bluetooth™ or BLE transceiver) and/or a WLAN transceiver (e.g., a transceiver compatible with an IEEE 802.11 protocol). For example, the network device 204 includes a WLAN transceiver (e.g., a transceiver compatible with an IEEE 802.11 protocol) and a short-range communications transceiver (e.g., a Bluetooth™ or BLE transceiver). In some embodiments, the network device (e.g., a wireless AP) includes multiple antennas and multiple wireless transceivers that share the antennas. In some embodiments, the controller 234 is configured to control the transceiver 232 to process packets received through the antenna 236 and/or the network port 238 and/or to generate outgoing packets to be transmitted through the antenna 236 and/or the network port 238. In some embodiments, the controller 234 is configured to obtain and/or store information relevant to the network device 204 (e.g., security information relevant to the network device 204 such as security certificate information). For example, the controller 234 may be configured to obtain and/or store security information relevant to the network device 204 such as security certificate information. In some embodiments, the controller 234 includes a storage device (e.g., one or more hard disks, flash memory modules, solid state disks, and/or optical disks) that contains or stores a predefined information (e.g., a predefined security certificate), which may be placed or embedded into the network device during a manufacturing process. In some embodiments, the controller 234 is implemented using at least one processor (e.g., a microcontroller, a DSP, and/or a CPU). In some embodiments, the controller 234 executes one or more Layer 3 or L3 (i.e., the network layer, which is the third level (Layer 3) of the Open Systems Interconnection Model (OSI Model)) protocols, for example, an Internal Gateway Protocol (IGP) (e.g., an Open Shortest Path First (OSPF) protocol), a Border Gateway Protocol (BGP), or an Intermediate System to Intermediate System (IS-IS) protocol. The controller 234 may include a processor (e.g., a microcontroller, a DSP, and/or a CPU) configured to execute one or more Layer 3 (L3) protocols, and memory that may store information (e.g., an operation system (OS)) for the processor. The antenna 236 may be any suitable type of antenna. For example, the antenna 236 may be an induction type antenna such as a loop antenna or any other suitable type of induction type antenna. However, the antenna 236 is not limited to an induction type antenna. The network port 238 may be any suitable type of port. For example, the network port 238 may be a local area network (LAN) network port such as an Ethernet port. However, the network port 238 is not limited to LAN network ports. In some embodiments, the network device 204 is a wired communications device that includes at least one wired transceiver (e.g., the transceiver 232) and at least one network port (e.g., the network port 238) that is used to connect to another communication device through at least one cable or wire, for example, at least one Ethernet cable. In some embodiments, as a wired device, the network device 204 includes a wireless transceiver and at least one antenna (e.g., the antenna 236).

Figure 3:
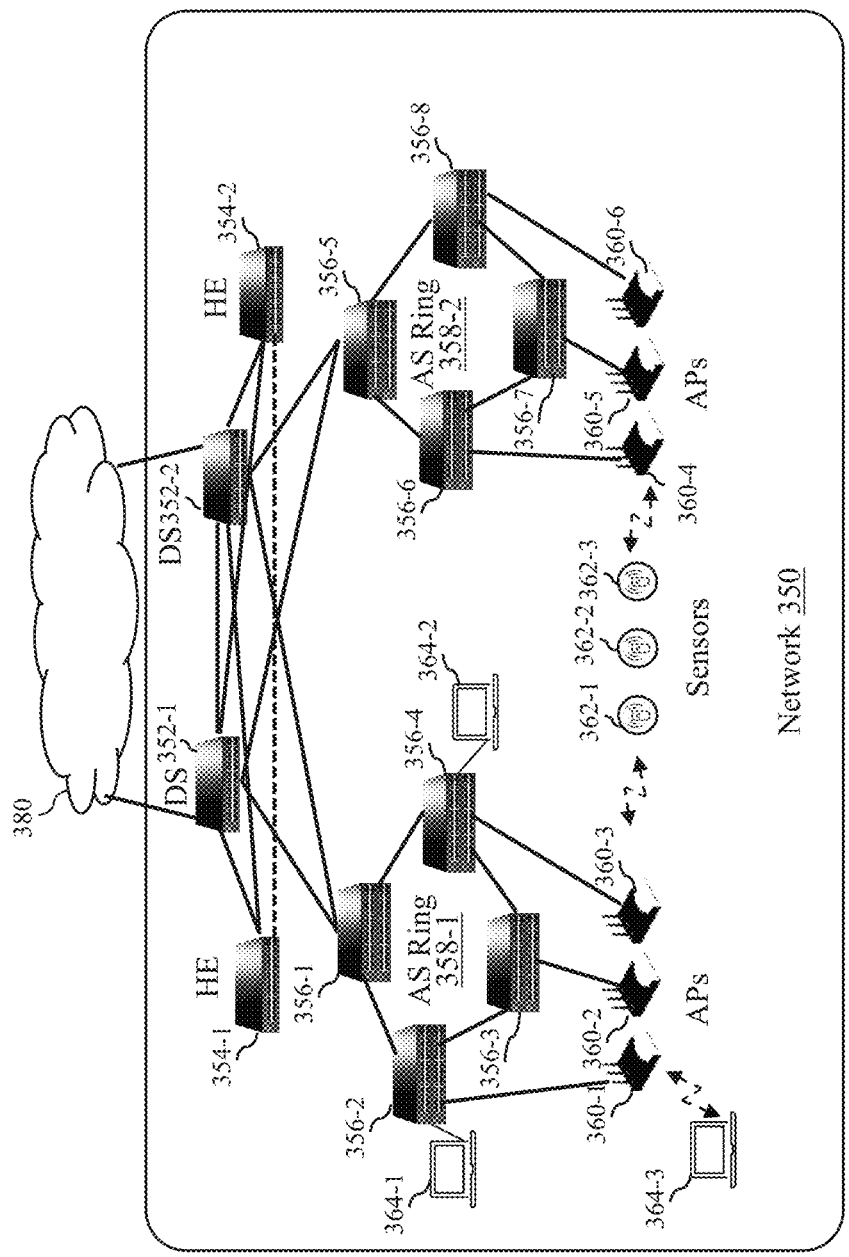
FIG. 3 depicts a network that can be included in the communications system depicted in FIG. 1.

FIG. 3 depicts a network 350 that can be included in the communications system 100 depicted in FIG. 1. The network 350 depicted in FIG. 3 is an embodiment of the network 150 depicted in FIG. 1. However, the network 150 depicted in FIG. 1 is not limited to the embodiment depicted in FIG. 3. In the embodiment depicted in FIG. 3, the network 350 includes a pair of distribution switches (DSs) or distribution layer switches 352-1, 352-2 that are aggregation switches functioning as a bridge between core layer switches and access layer switches, a pair of head ends (HEs) or gateways 354-1, 354-2, a number of access switches (ASs) 356-1, 356-2, 356-3, 356-4, 356-5, 356-6, 356-7, 356-8 connected in rings 358-1, 358-2 that directly interact with lower level devices (e.g., wireless APs), a number of wireless APs 360-1, 360-2, 360-3, 360-4, 360-5, 360-6 connected to the ASs, a number of wireless sensors 362-1, 362-2, 362-3 that wirelessly connect to the wireless APs, and a number of network devices 364-1, 364-2, 364-3 that are connected to the ASs 356-2, 356-4, and the wireless AP 360-1 through cables or wires, for example, Ethernet cables. The DSs 352-1, 352-2, the HEs 354-1, 354-2, the ASs 356-1, 356-2, 356-3, 356-4, 356-5, 356-6, 356-7, 356-8, the wireless APs 360-1, 360-2, 360-3, 360-4, 360-5, 360-6, the wireless sensors 362-1, 362-2, 362-3, and/or the network devices 364-1, 364-2, 364-3 may be an embodiment of the network device 204 depicted in FIG. 2. The network devices 364-1, 364-2, 364-3 may be wired and/or wireless devices, for example, laptops, desktop PCs, or other wired devices. In some embodiments, each of the network devices 364-1, 364-2, 364-3 includes at least one wired transceiver (e.g., the transceiver 232) and at least one network port (e.g., the network port 238) that is used to connect to another communication device through at least one cable or wire, for example, at least one Ethernet cable. In some embodiments, as a wired device, each of the network devices 364-1, 364-2, 364-3 includes a wireless transceiver and at least one antenna (e.g., the antenna 236). In some embodiments, the network 350 also includes at least one wired communications device that is connected to the DS 352-1 or 352-2 through at least one cable or wire, for example, at least one Ethernet cable. In the embodiment depicted in FIG. 3, the DSs 352-1, 352-2 are connected to a network 380 (e.g., the Internet), which is connected to a network management module (e.g., the network management module (NMM) 110 of the cloud server 102 depicted in FIG. 1). In some embodiments, the DSs 352-1, 352-2, the HEs 354-1, 354-2, and the ASs 356-1, 356-2, 356-3, 356-4, 356-5, 356-6, 356-7, 356-8 constitute a network service block (NSB), which is a basic building block for providing connectivity as a service and is a replicable block that can be scaled (e.g., expanded) to meet any deployment. In some embodiments, the NSB works in Layer 3 or L3 (i.e., the network layer, which is the third level (Layer 3) of the OSI Model) environment and is connected to other wired devices under L3 mode. A wired communications device of a customer (e.g., the network device 364-1, 364-2, or 364-3) can connect to the NSB on an L3 interface in a secured manner. Although the network 350 is shown with certain components and described with certain functionality herein, other embodiments of the network 350 may include fewer or more components to implement the same, less, or more functionality. For example, in some embodiments, the network 350 includes only one DS, more than two DSs, no HE, only one HE, more than two HEs, less than eight ASs, more than eight ASs, less than six wireless APs, more than six wireless APs, less than three wireless sensors, more than three wireless sensors, more than three network devices, and/or less than three network devices. Although each of the rings 358-1, 358-2 includes four ASs in the embodiment depicted in FIG. 3, in other embodiments, the number of ASs in each of the rings 358-1, 358-2 may be more than four or less than four. In another example, although the network 350 shown in FIG. 3 as being connected in certain topology, the network topology of the network 350 is not limited to the topology shown in FIG. 3. In some embodiments, the number of HEs and DSs is constant in the network 350 while the number of the wireless APs, the ASs, and the sensor(s) in the network 350 varies.

Security measures between devices can be complicated and challenging because different genres of devices (e.g., native and non-native devices) that can be present in a network. In some embodiments, a native device for a network is a device that is designed or manufactured by the same manufacturer that produces one or more devices forming a network architecture (e.g., a NSB formed by the DSs 352-1, 352-2, the HEs 354-1, 354-2, and the ASs 356-1, 356-2, 356-3, 356-4, 356-5, 356-6, 356-7, 356-8 depicted in FIG. 3) of the network. For example, a device may be a native device for a network if the device and an upstream device (e.g., an AS, a DS, or an HE) are designed or manufactured by the same manufacturer. As an example, the network device 364-1 is a native device for the network 350 if the network device 364-1 and the AS 356-2 are designed or manufactured by the same manufacturer, while the network device 364-2 is a native device for the network 350 if the network device 364-2 and the AS 356-4 are designed or manufactured by the same manufacturer. In some embodiments, all of the ASs 356-1, 356-2, 356-3, 356-4, 356-5, 356-6, 356-7, 356-8 are manufactured by the same manufacturer. In some embodiments, all of the DSs 352-1, 352-2, the HEs 354-1, 354-2, and the ASs 356-1, 356-2, 356-3, 356-4, 356-5, 356-6, 356-7, 356-8 that form the network architecture of the network 350 are manufactured by the same manufacturer. In some embodiments, a native device contains or stores a predefined security certificate, which may be placed or embedded into the native device during a manufacturing process, while one or more devices forming a network architecture of the network also contain or store one or more predefined security certificates, which may be placed or embedded into the one or more devices during a manufacturing process, and device authentication can be performed based on exchanging stored security certificates. In some embodiments, a non-native device for a network is a device that is not designed or manufactured by the same manufacturer that produces one or more devices forming a network architecture of the network. For example, a device may be a non-native device of a network if the device and an upstream device (e.g., an AS, a DS, or an HE) are designed or manufactured by different manufacturers. As an example, the network device 364-1 is a non-native device for the network 350 if the network device 364-1 and the AS 356-2 are designed or manufactured by different manufacturers, while the network device 364-2 is a non-native device for the network 350 if the network device 364-2 and the AS 356-4 are designed or manufactured by different manufacturers. In some embodiments, all of the ASs 356-1, 356-2, 356-3, 356-4, 356-5, 356-6, 356-7, 356-8 are manufactured by the same manufacturer. In some embodiments, all of the DSs 352-1, 352-2, the HEs 354-1, 354-2, and the ASs 356-1, 356-2, 356-3, 356-4, 356-5, 356-6, 356-7, 356-8 that form the network architecture of the network 350 are manufactured by the same manufacturer. In some embodiments, a non-native device for a network does not contain or store a predefined security certificate, while one or more devices forming a network architecture of the network contain or store one or more predefined security certificates, which may be placed or embedded into the one or more devices during a manufacturing process, and device authentication cannot be performed based on exchanging stored security certificates. For a non-native device for a network, other authentication technique (e.g., exchanging of port-based Network Access Control (PNAC) messages) is used.

In the embodiment depicted in FIG. 3, the network 350 implements a network security technology that can work with different genres of devices (e.g., native and non-native devices) and safeguard the security of the network 350. In some embodiments, when a switch (e.g., an AS 356-1, 356-2, 356-3, 356-4, 356-5, 356-6, 356-7, or 356-8) boots up, the switch connects one or more wired devices (e.g., the wired network devices 364-1, 364-2) and/or one or more wireless APs (e.g., the wireless APs 360-1, 360-2, 360-3, 360-4, 360-5, 360-6) to the network 350. In some embodiments, when a device (e.g., the wired network device 364-1 or 364-2 or the wireless AP 360-1, 360-2, 360-3, 360-4, 360-5, or 360-6) is connected to a network port of a switch (e.g., an AS 356-1, 356-2, 356-3, 356-4, 356-5, 356-6, 356-7, or 356-8 or a DS 352-1 or 352-2), the switch has zero trust in the device for security reasons. In these embodiments, the switch may allow a limited traffic from the device to access the network for a certain time duration. The switch may place the device into either an allowed list of devices or a prohibited list of devices based on an exchange of security messages. In some embodiments, a client provides or includes media access control address (MAC address) of allowed devices to the switch. The switch may differentiate between native devices and non-native devices based on security credentials (e.g., security certificates) stored in devices. Consequently, the security of the network 350 is improved.

Figure 4:
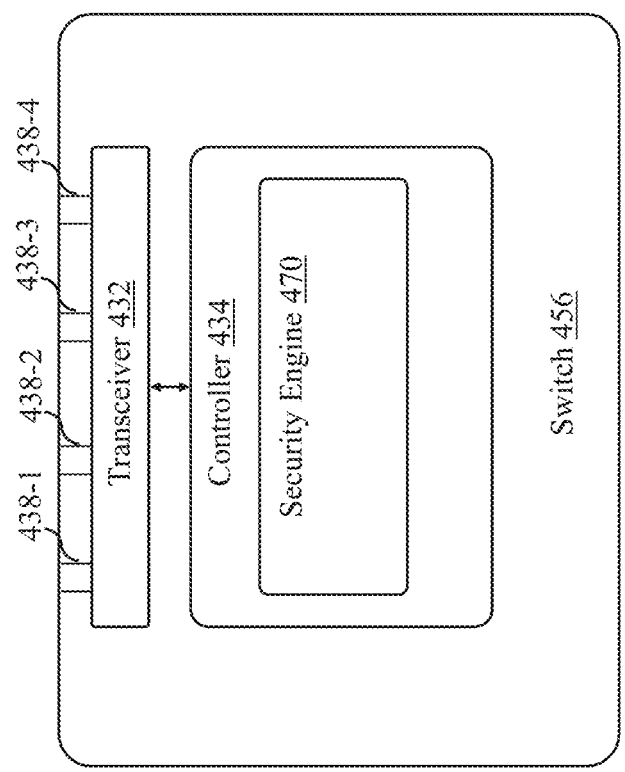
FIG. 4 depicts an embodiment of a switch that can be included in the network depicted in FIG. 3.

FIG. 4 depicts an embodiment of a switch 456 that can be included in the network 350 depicted in FIG. 3. The switch 456 may be an embodiment of the DSs 352-1, 352-2 and the ASs 356-1, 356-2, 356-3, 356-4, 356-5, 356-6, 356-7, 356-8 of the network 350 depicted in FIG. 3. However, the DSs 352-1, 352-2 and the ASs 356-1, 356-2, 356-3, 356-4, 356-5, 356-6, 356-7, 356-8 of the network 350 depicted in FIG. 3 are not limited to the embodiment depicted in FIG. 4. In the embodiment depicted in FIG. 4, the switch 456 includes at least one wireless and/or wired transceiver 432, four network ports 438-1, 438-2, 438-3, 438-4 operably connected to the transceiver 432, and a controller 434 operably connected to the transceiver 432. In some embodiments, the transceiver 432 includes a physical layer (PHY) device. The transceiver 432 may be any suitable type of transceiver. For example, the transceiver 432 may be a LAN (e.g., Ethernet) transceiver. In some embodiments, the switch 456 includes multiple transceivers. The network ports 438-1, 438-2, 438-3, 438-4 may be any suitable type of ports. For example, the network ports 438-1, 438-2, 438-3, 438-4 may be LAN network ports such as Ethernet ports. However, the network ports 438-1, 438-2, 438-3, 438-4 are not limited to LAN network ports. The network ports 438-1, 438-2, 438-3, 438-4 can be used to connect the switch 456 to corresponding network ports of peer ASs or DSs, one or more wireless APs, and/or one or more wired communications devices. For example, the network ports 438-1, 438-2 are connected to network ports of peer ASs, while the network ports 438-3, 438-4 are connected to a wireless AP and a wired communications device (e.g., a laptop computer or a desktop computer), two wireless APs, or two wired communications devices. In some embodiments, the switch 456 includes different number of network ports. In some embodiments, the switch works in Layer 3 or L3 (i.e., the network layer, which is the third level (Layer 3) of the OSI Model) environment and is connected to other wired devices under L3 mode. A wired client (WC) of a customer (e.g., the wired communications device 364-1, 364-2, or 364-3) can connect to the switch 456 on an L3 interface in a secured manner. In some embodiments, the switch 456 includes one or more antennas. In some embodiments, the controller 434 is configured to control the transceiver 432 to process packets received through the network ports 438-1, 438-2, 438-3, 438-4 and/or to generate outgoing packets to be transmitted through the network ports 438-1, 438-2, 438-3, 438-4. In some embodiments, the controller 434 is configured to obtain and/or store security information relevant to the switch 456. In some embodiments, the controller 434 executes one or more Layer 3 (L3) protocols, for example, an Internal Gateway Protocol (IGP) (e.g., an OSPF protocol), a Border Gateway Protocol (BGP), or an Intermediate System to Intermediate System (IS-IS) protocol. The controller 434 may include a processor (e.g., a microcontroller, a DSP, and/or a CPU) configured to execute one or more Layer 3 (L3) protocols, and memory that may store information (e.g., an OS) for the processor. In the embodiment depicted in FIG. 4, the switch 456 includes a security engine 470 configured to execute one or more security functions. In some embodiments, the switch 456 includes a processor (e.g., a microcontroller, a DSP, and/or a CPU) configured to execute one or more security operations, and memory that may store information (e.g., an operation system (OS)) for the processor. In these embodiments, the controller 434 (e.g., the security engine 470) is implemented using a processor and memory. In some embodiments, the controller 434 (e.g., the security engine 470) includes a storage device (e.g., one or more hard disks, flash memory modules, solid state disks, and/or optical disks) that contains or stores predefined information (e.g., a predefined security certificate), which may be placed or embedded into the switch 456 during a manufacturing process. In some embodiments, when the switch 456 starts up, the switch 456 (e.g., the transceiver 432 and/or controller 434) connects, through one or more network ports 438-1, 438-2, 438-3, 438-4, one or more wired devices (e.g., the wired network devices 364-1, 364-2) and/or one or more wireless APs (e.g., the wireless APs 360-1, 360-2, 360-3, 360-4, 360-5, 360-6) to a network (e.g., the network 350). In some embodiments, when a device (e.g., the wired network device 364-1 or 364-2 or the wireless AP 360-1, 360-2, 360-3, 360-4, 360-5, or 360-6) is connected to the network port 438-1, 438-2, 438-3, or 438-4 of the switch 456, the switch 456 (e.g., the transceiver 432 and/or the controller 434) has zero trust in the device for security reasons. In these embodiments, the switch 456 (e.g., the transceiver 432 and/or the controller 434) may allow a limited traffic from the device to access the network for a certain time duration. The switch 456 (e.g., the transceiver 432 and/or the controller 434) can place the device into either an allowed list of devices or a prohibited list of devices based on an exchange of security messages. In some embodiments, a client provides or includes media access control address (MAC address) of allowed devices to the switch. The switch 456 (e.g., the transceiver 432 and/or the controller 434) differentiates between native devices and non-native devices based on security credentials (e.g., security certificates) stored in devices.

Figure 5:
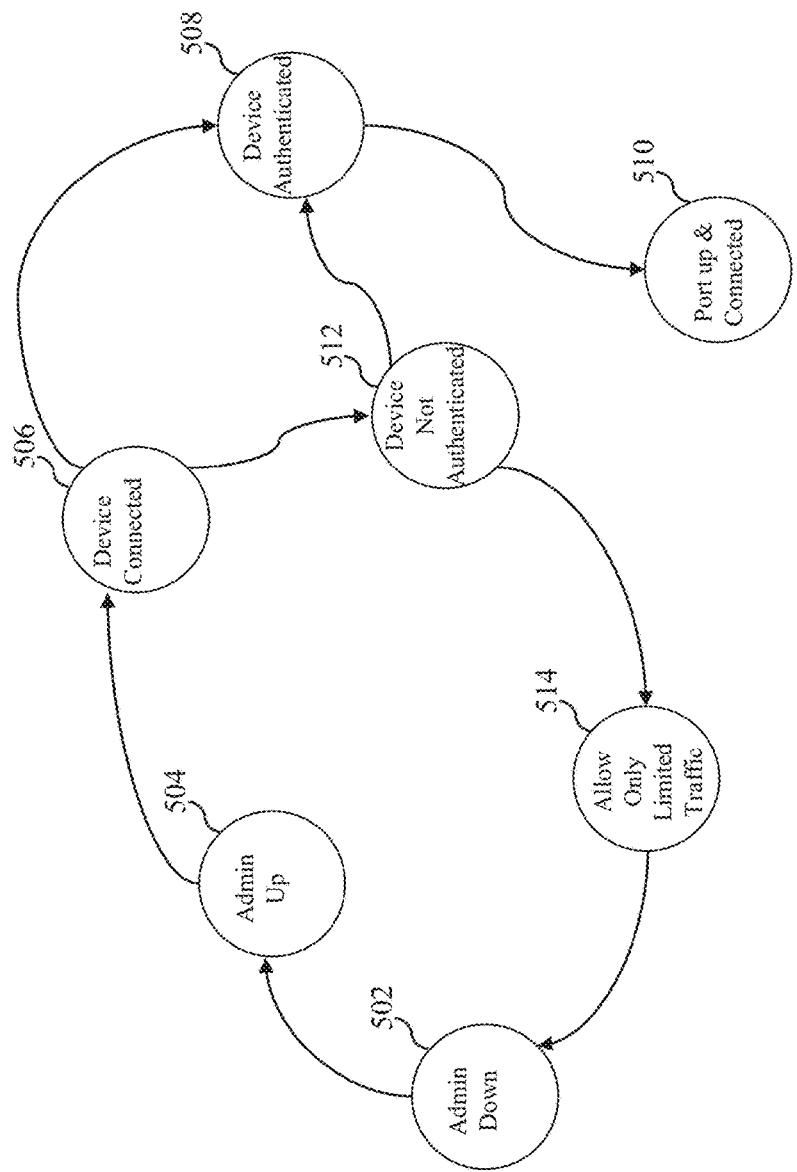
FIG. 5 illustrates a state diagram of a network port of the switch depicted in FIG. 4.

FIG. 5 illustrates a state diagram 500 of a network port 438-1, 438-2, 438-3, or 438-4 of the switch 456 depicted in FIG. 4. The switch 456 may be an AS (e.g., the AS 356-1, 356-2, 356-3, 356-4, 356-5, 356-6, 356-7, or 356-8 depicted in FIG. 3) or a DS (e.g., the DS 352-1 or 352-2 depicted in FIG. 3). In the state diagram 500 illustrated in FIG. 5, when the switch 456 boots or starts up, the network port goes from an "admin down" state 502 to an "admin up" state 504, and to a "device connected" state 506 when a device (e.g., one of the wired network devices 364-1, 364-2 or one of the wireless APs 360-1, 360-2, 360-3, 360-4, 360-5, 360-6) is connected to the network port. If the device is authenticated, the network port goes from the "device connected" state 506 to a "device authenticated" state 508 and then to a "port up & connected" state 510, which indicates that the switch 456 connects the device to a network (e.g., the network 350). If the device is not authenticated, the network port goes from the "device connected" state 506 to a "device not authenticated" state 512 and then to an "allow only limited traffic" state 514. The network port can go from the "device not authenticated" state 512 to the "device authenticated" state 508 when the device is authenticated by the switch 456.

Figure 6:
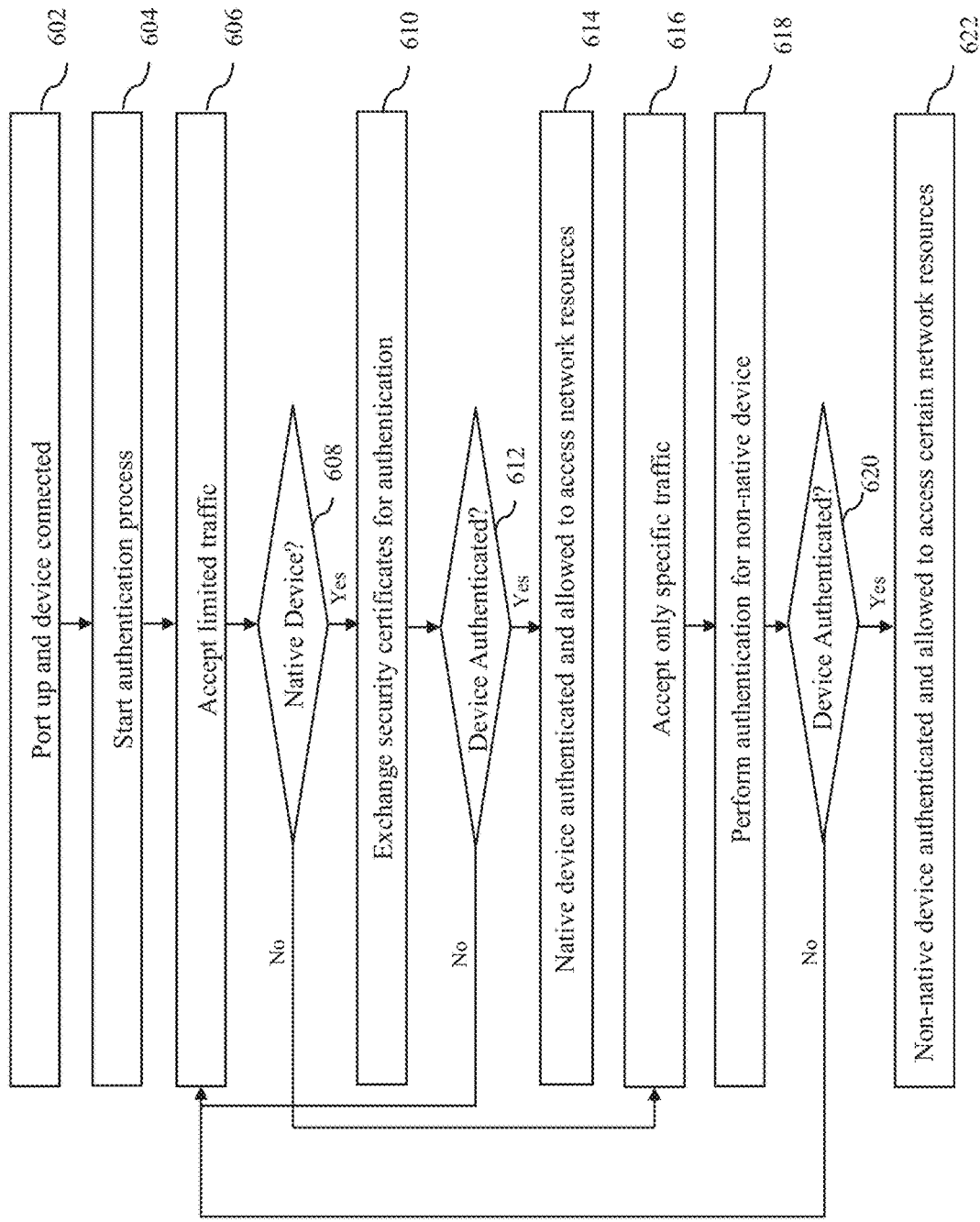
FIG. 6 is a flow diagram of a security operation of the switch depicted in FIG. 4 in accordance with an embodiment of the invention.

Security operations of the switch 456 depicted in FIG. 4 may be implemented using different algorithms. FIG. 6 is a flow diagram of a security operation of the switch 456 depicted in FIG. 4 in accordance with an embodiment of the invention. The switch 456 may be an AS (e.g., the AS 356-1, 356-2, 356-3, 356-4, 356-5, 356-6, 356-7, or 356-8 depicted in FIG. 3) or a DS (e.g., the DS 352-1 or 352-2 depicted in FIG. 3).

As illustrated in FIG. 6, the security operation of the switch 456 depicted in FIG. 4 begins at block 602, when the switch 456 boots or starts up, a network port 438-1, 438-2, 438-3, or 438-4 of the switch 456 is connected to a device (e.g., one of the wired network devices 364-1, 364-2 or one of the wireless APs 360-1, 360-2, 360-3, 360-4, 360-5, 360-6). Next at block 604, an authentication process starts. When the device is being authenticated, limited data traffic from the device is accepted or allowed by the switch 456 at block 606. In some embodiments, when a device is connected to a network port of the switch 456 and is prior to that the device is authenticated by the switch 456, the switch accepts or allows only packets containing Link Layer Discovery Protocol (LLDP), Dynamic Host Configuration Protocol (DHCP), Address Resolution Protocol (ARP) information, Transport Layer Security (TLS) messages within one hop, and IEEE 802.1X port-based Network Access Control (PNAC) messages from the device. In some embodiments, all other traffic from un-authenticated device is directed or "homed" to a default page. Consequently, the security of a network is improved.

At block 608, a determination is made whether the device is a native device, for example, a native device for a network in which the switch 456 is located. In some embodiments, a native device for a network is a device that is designed or manufactured by the same manufacturer that produces one or more devices forming a network architecture of the network. For example, a device may be a native device for a network if the device and an upstream device (e.g., an AS, a DS, or an HE) are designed or manufactured by the same manufacturer. In some embodiments, a native device contains or stores a predefined security certificate, which may be placed or embedded into the native device during a manufacturing process, while one or more devices forming a network architecture of the network also contain or store one or more predefined security certificates, which may be placed or embedded into the one or more devices during a manufacturing process, and device authentication can be performed based on exchanging stored security certificates. In some embodiments, a non-native device for a network is a device that is not designed or manufactured by the same manufacturer that produces one or more devices forming a network architecture of the network. For example, a device may be a non-native device of a network if the device and an upstream device (e.g., an AS, a DS, or an HE) are designed or manufactured by different manufacturers. In some embodiments, a non-native device for a network does not contain or store a predefined security certificate, while one or more devices forming a network architecture of the network contain or store one or more predefined security certificates, which may be placed or embedded into the one or more devices during a manufacturing process, and device authentication cannot be performed based on exchanging stored security certificates. For a non-native device for a network, other authentication technique (e.g., exchanging of port-based Network Access Control (PNAC) messages) is used. In some embodiment, the switch 456 decides whether the device is a native device or a non-native device based on LLDP system description related to the device. In some embodiment, the switch 456 decides whether the device is a native device or a non-native device based on DHCP information of the device that may be carried in a DHCP request from the device to the switch 456. In some embodiments, TLS and/or Hypertext Transfer Protocol Secure (HTTPS) traffic from a native device is allowed by the switch 456 to connect the native device to a network (e.g., the network 350). If yes, then the operation proceeds to block 610, where security certificates are exchanged between the device and the switch 456 for authentication. At block 612, a determination is made by the switch 456 whether the device, as a native device, is successfully authenticated. If yes, then the operation proceeds to block 614, the device, as a native device, is successfully authenticated and is allowed to access network resources in a network (e.g., the network 350 depicted in FIG. 3). If not, then the operation can proceed to block 606, limited data traffic from the device is accepted or allowed by the switch 456. In some embodiments, all other traffic from un-authenticated device is directed or "homed" to a default page. Consequently, the security of a network is improved.

If at block 608 a determination is made by the switch 456 that the device is a non-native device for the network, the operation proceeds to block 614, where the device is allowed to access only a specific destination or web address (e.g., a web resource with a specific Uniform Resource Locator (URL)) and limited data traffic from the device is accepted or allowed by the switch 456 at block 616. For example, a non-native device may be directed or "homed" to a default page. In some embodiments, when a determination is made by the switch 456 that the device is a non-native device, the switch places the network port through which the device is connected to the switch into a "limited open" mode and the switch accepts or allows only packets containing LLDP, DHCP, ARP information, TLS messages within one hop, and IEEE 802.1X PNAC messages from the device. Next at block 618, the switch 456 performs authentication for the non-native device, for example, based on IEEE 802.1X PNAC messages exchanged with the device. At block 620, a determination is made by the switch 456 whether the device, as a non-native device, is successfully authenticated. If yes, then the operation proceeds to block 622, the device, as a non-native device, is successfully authenticated and is allowed to access certain network resources in a network (e.g., the network 350 depicted in FIG. 3), for example, a subset of all network resources in a network but not every resource in the network that can be accessed by a native device. If not, then the operation can proceed to block 606, limited data traffic from the device is accepted or allowed by the switch 456. In some embodiments, all other traffic from un-authenticated device is directed or "homed" to a default page. Consequently, the security of a network is improved.

Figure 7:
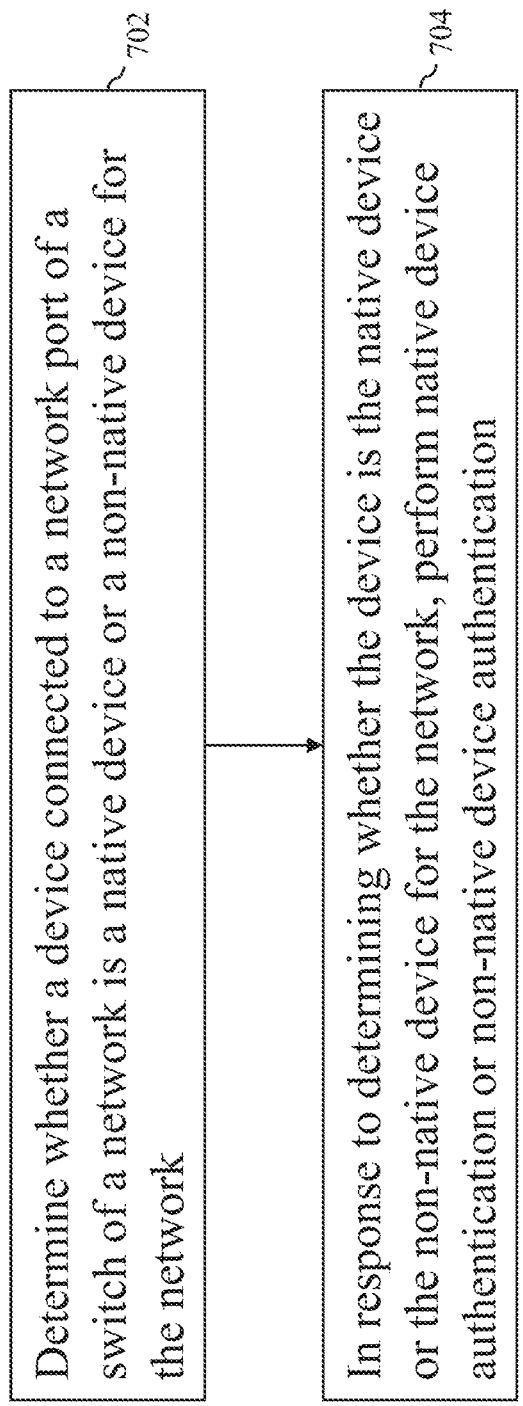
FIG. 7 is a process flow diagram of a method for network security in accordance to an embodiment of the invention.

FIG. 7 is a process flow diagram of a method for network security in accordance to an embodiment of the invention. According to the method, at block 702, it is determined whether a device connected to a network port of a switch of a network is a native device or a non-native device for the network. At block 704, in response to determining whether the device is the native device or the non-native device for the network, native device authentication or non-native device authentication is performed. In some embodiments, it is determined whether the device is the native device or the non-native device for the network based on Link Layer Discovery Protocol (LLDP) information related to the device. In some embodiments, it is determined whether the device is the native device or the non-native device for the network based on Dynamic Host Configuration Protocol (DHCP) information related to the device. In some embodiments, prior to native device authentication or non-native device authentication is completed, data traffic through the network port of the switch from the device is limited. In some embodiments, before native device authentication or non-native device authentication is completed, only a message containing Link Layer Discovery Protocol (LLDP), Dynamic Host Configuration Protocol (DHCP), or Address Resolution Protocol (ARP) information, a Transport Layer Security (TLS) message within one hop, and an IEEE 802.1X port-based Network Access Control (PNAC) message is allowed from the device through the network port of the switch. In some embodiments, before native device authentication or non-native device authentication is completed, data traffic from the device is directed to a default page. In some embodiments, native device authentication is performed when the device is determined as the native device, and non-native device authentication is performed when the device is determined as the non-native device. In some embodiments, native device authentication is performed by exchanging security certificates between the switch and the device. In some embodiments, the device is allowed to access network resources in the network when native device authentication is successfully performed. In some embodiments, non-native device authentication is performed by exchanging port-based Network Access Control (PNAC) messages between the switch and the device. In some embodiments, the device is allowed to access only a subset of network resources in the network when non-native device authentication is successfully performed. In some embodiments, the switch includes an access switch (AS) of the network or a distribution switch (DS) of the network. In some embodiments, the AS is connected to at least one distribution switch (DS) of the network. In some embodiments, the device includes a wireless access point (AP). The switch may be similar to, the same as, or a component of the ASs 356-1, 356-2, 356-3, 356-4, 356-5, 356-6, 356-7, 356-8 depicted in FIG. 3, and/or the switch 456 depicted in FIG. 4. The network port may be similar to, the same as, or a component of the network port 238 depicted in FIG. 2 and/or the network ports 438-1, 438-2, 438-3, 438-4 depicted in FIG. 4. The device may be similar to, the same as, or a component of the wireless APs 360-1, 360-2, 360-3, 360-4, 360-5, 360-6 depicted in FIG. 3 and/or the network devices 364-1, 364-2 depicted in FIG. 3. The DS may be similar to, the same as, or a component of the DSs 352-1, 352-2 depicted in FIG. 3. The wireless AP may be similar to, the same as, or a component of the wireless APs 360-1, 360-2, 360-3, 360-4, 360-5, 360-6 depicted in FIG. 3.

Figure 8:
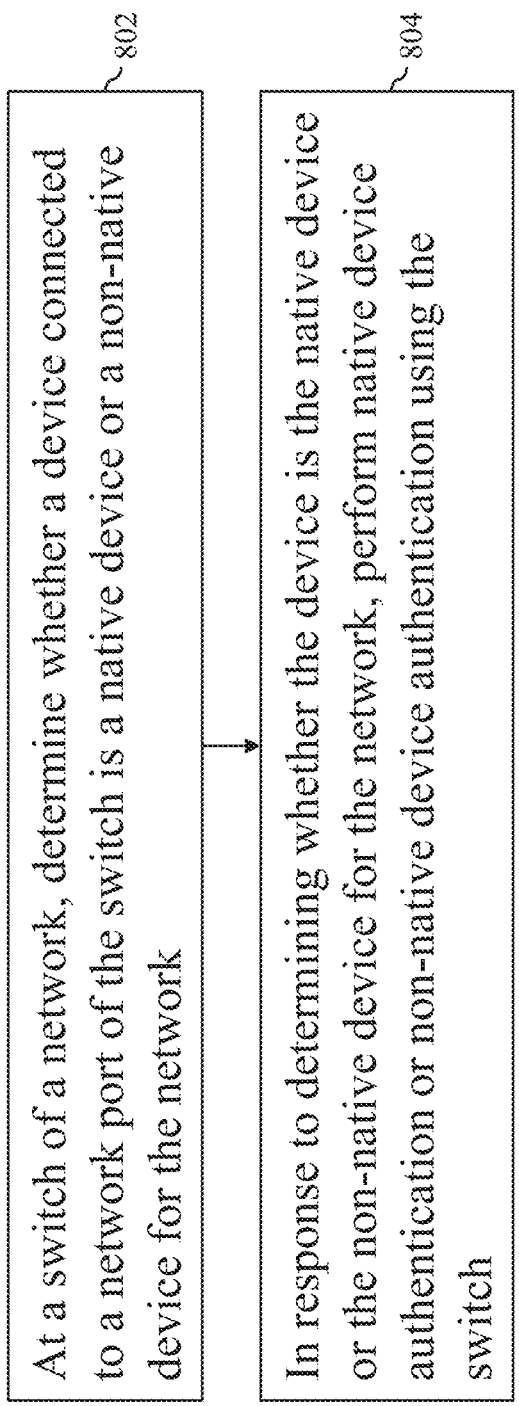
FIG. 8 is a process flow diagram of a method for network security in an enterprise campus network in accordance to an embodiment of the invention.

FIG. 8 is a process flow diagram of a method for network security in accordance to an embodiment of the invention. According to the method, at block 802, at a switch of a network, it is determined whether a device connected to a network port of the switch is a native device or a non-native device for the network. At block 804, in response to determining whether the device is the native device or the non-native device for the network, native device authentication or non-native device authentication is performed using the switch. In some embodiments, it is determined whether the device is the native device or the non-native device for the network based on Link Layer Discovery Protocol (LLDP) information or Dynamic Host Configuration Protocol (DHCP) information related to the device that is received at the switch. In some embodiments, prior to native device authentication or non-native device authentication is completed, data traffic is directed from the device to a default page. In some embodiments, native device authentication is performed using the switch when the device is determined as the native device, and non-native device authentication is performed using the switch when the device is determined as the non-native device. In some embodiments, native device authentication is performed by exchanging security certificates between the switch and the device, and non-native device authentication is performed by exchanging port-based Network Access Control (PNAC) messages between the switch and the device. The switch may be similar to, the same as, or a component of the ASs 356-1, 356-2, 356-3, 356-4, 356-5, 356-6, 356-7, 356-8 depicted in FIG. 3, and/or the switch 456 depicted in FIG. 4. The network port may be similar to, the same as, or a component of the network port 238 depicted in FIG. 2 and/or the network ports 438-1, 438-2, 438-3, 438-4 depicted in FIG. 4. The device may be similar to, the same as, or a component of the wireless APs 360-1, 360-2, 360-3, 360-4, 360-5, 360-6 depicted in FIG. 3 and/or the network devices 364-1, 364-2 depicted in FIG. 3.

Figure 9:
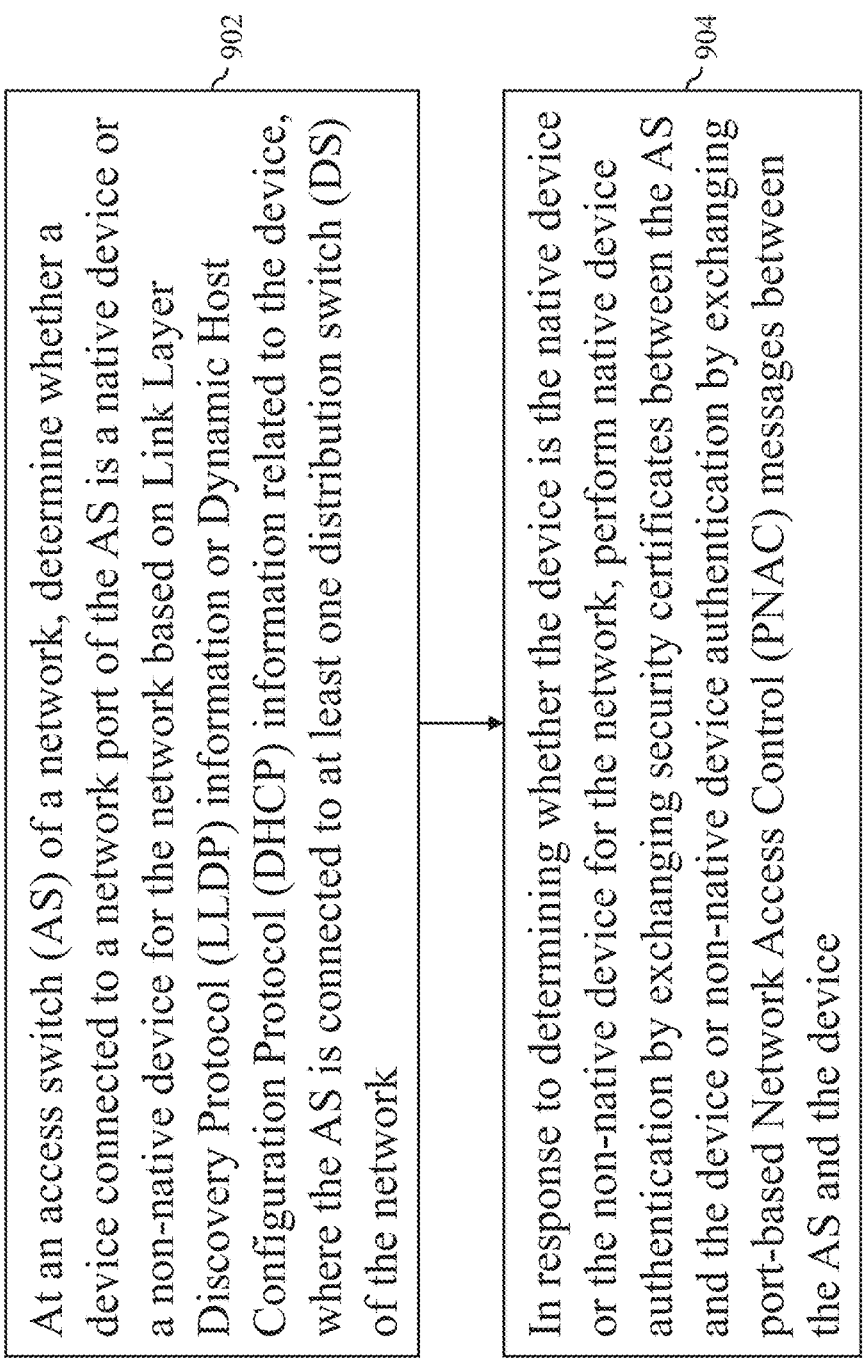
FIG. 9 is a process flow diagram of a method for network security in an enterprise campus network in accordance to an embodiment of the invention.

FIG. 9 is a process flow diagram of a method for network security in accordance to an embodiment of the invention. According to the method, at block 902, at an access switch (AS) of a network, it is determined whether a device connected to a network port of the AS is a native device or a non-native device for the network based on Link Layer Discovery Protocol (LLDP) information or Dynamic Host Configuration Protocol (DHCP) information related to the device, where the AS is connected to at least one distribution switch (DS) of the network. At block 904, in response to determining whether the device is the native device or the non-native device for the network, native device authentication is performed by exchanging security certificates between the AS and the device or non-native device authentication is performed by exchanging port-based Network Access Control (PNAC) messages between the AS and the device. The AS may be similar to, the same as, or a component of the ASs 356-1, 356-2, 356-3, 356-4, 356-5, 356-6, 356-7, 356-8 depicted in FIG. 3, and/or the switch 456 depicted in FIG. 4. The network port may be similar to, the same as, or a component of the network port 238 depicted in FIG. 2 and/or the network ports 438-1, 438-2, 438-3, 438-4 depicted in FIG. 4. The device may be similar to, the same as, or a component of the wireless APs 360-1, 360-2, 360-3, 360-4, 360-5, 360-6 depicted in FIG. 3 and/or the network devices 364-1, 364-2 depicted in FIG. 3. The DS may be similar to, the same as, or a component of the DSs 352-1, 352-2 depicted in FIG. 3.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for network security, the method comprising:
determining whether a device connected to a network port of a switch of a network is a native device or a non-native device for the network, wherein the device is the native device of the network if the device and the switch are designed or manufactured by same manufacturer, and wherein the device is the non-native device of the network if the device and the switch are designed or manufactured by different manufacturers; and in response to determining whether the device is the native device or the non-native device for the network, performing native device authentication or non-native device authentication, wherein in response to determining whether the device is the native device or the non-native device for the network, performing native device authentication or non-native device authentication comprises:

performing native device authentication when the device is determined as the native device, wherein performing native device authentication when the device is determined as the native device comprises exchanging a plurality of security certificates between the switch and the device; and performing non-native device authentication when the device is determined as the non-native device, wherein performing non-native device authentication when the device is determined as the non-native device comprises exchanging a plurality of port-based Network Access Control (PNAC) messages between the switch and the device.

2. The method of claim 1, wherein determining whether the device is the native device or the non-native device for the network comprises determining whether the device is the native device or the non-native device for the network based on Link Layer Discovery Protocol (LLDP) information related to the device.

3. The method of claim 1, wherein determining whether the device is the native device or the non-native device for the network comprises determining whether the device is the native device or the non-native device for the network based on Dynamic Host Configuration Protocol (DHCP) information related to the device.

4. The method of claim 1, further comprising prior to native device authentication or non-native device authentication is completed, limiting data traffic through the network port of the switch from the device.

5. The method of claim 1, further comprising before native device authentication or non-native device authentication is completed, only allowing a message containing Link Layer Discovery Protocol (LLDP), Dynamic Host Configuration Protocol (DHCP), or Address Resolution Protocol (ARP) information, a Transport Layer Security (TLS) message within one hop, and an IEEE 802.1X PNAC message from the device through the network port of the switch.

6. The method of claim 1, further comprising before native device authentication or non-native device authentication is completed, directing data traffic from the device to a default page.

7. The method of claim 1, further comprising allowing the device to access a plurality of network resources in the network when native device authentication is successfully performed.

8. The method of claim 1, further comprising allowing the device to access only a subset of a plurality of network resources in the network when non-native device authentication is successfully performed.

9. The method of claim 1, wherein the switch comprises an access switch (AS) of the network or a distribution switch (DS) of the network.

10. The method of claim 9, wherein the AS is connected to at least one distribution switch (DS) of the network.

11. The method of claim 1, wherein the device comprises a wireless access point (AP).

12. A method for network security, the method comprising:

at a switch of a network, determining whether a device connected to a network port of the switch is a native device or a non-native device for the network, wherein the device is the native device of the network if the device and the switch are designed or manufactured by same manufacturer, and wherein the device is the non-native device of the network if the device and the switch are designed or manufactured by different manufacturers; and in response to determining whether the device is the native device or the non-native device for the network, performing native device authentication or non-native device authentication using the switch, wherein in response to determining whether the device is the native device or the non-native device for the network, performing native device authentication or non-native device authentication using the switch comprises:

performing native device authentication using the switch when the device is determined as the native device, wherein performing native device authentication when the device is determined as the native device using the switch comprises exchanging a plurality of security certificates between the switch and the device; and performing non-native device authentication using the switch when the device is determined as the non-native device, wherein performing non-native device authentication when the device is determined as the non-native device using the switch comprises exchanging a plurality of port-based Network Access Control (PNAC) messages between the switch and the device.

13. The method of claim 12, wherein determining whether the device is the native device or the non-native device for the network using the switch comprises determining whether the device is the native device or the non-native device for the network based on Link Layer Discovery Protocol (LLDP) information or Dynamic Host Configuration Protocol (DHCP) information related to the device that is received at the switch.

14. The method of claim 12, further comprising prior to native device authentication or non-native device authentication is completed, directing data traffic from the device to a default page.

15. A method for network security, the method comprising:

at an access switch (AS) of a network, determining whether a device connected to a network port of the AS is a native device or a non-native device for the network based on Link Layer Discovery Protocol (LLDP) information or Dynamic Host Configuration Protocol (DHCP) information related to the device, wherein the AS is connected to at least one distribution switch (DS) of the network, wherein the device is the native device of the network if the device and the AS are designed or manufactured by same manufacturer, and wherein the device is the non-native device of the network if the device and the AS are designed or manufactured by different manufacturers; and in response to determining whether the device is the native device or the non-native device for the network, performing native device authentication by exchanging a plurality of security certificates between the AS and the device when the device is determined as the native device or non-native device authentication by exchanging a plurality of port-based Network Access Control (PNAC) messages between the AS and the device when the device is determined as the non-native device.

\* \* \* \* \*